June 12, 1962  G. C. BLAIN  3,038,261
PIPE LAYOUT APPARATUS AND METHOD
Filed Aug. 27, 1956  2 Sheets-Sheet 1
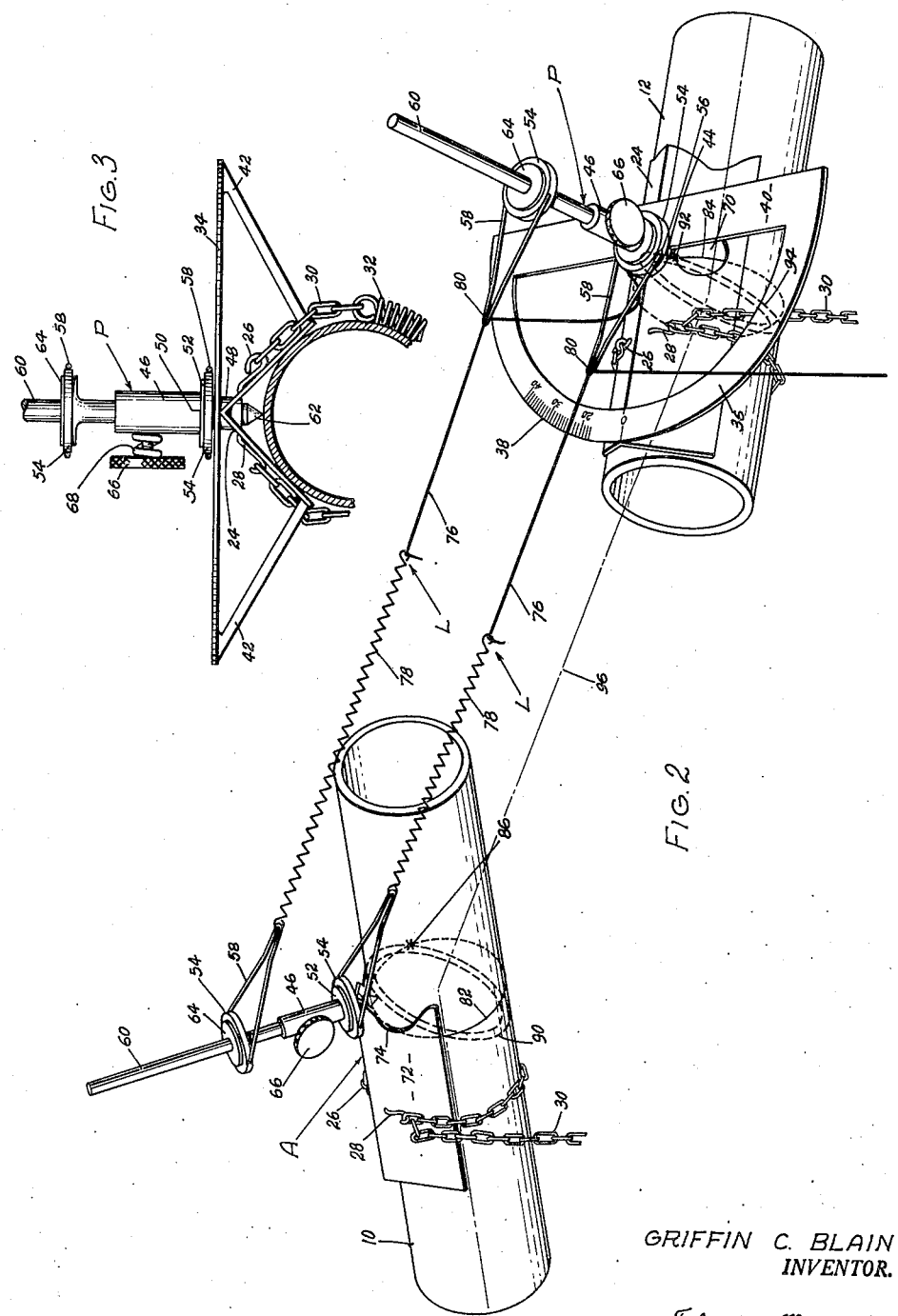
GRIFFIN C. BLAIN
INVENTOR.
BY Fulwider, Mattingly
and Huntley
ATTORNEYS.

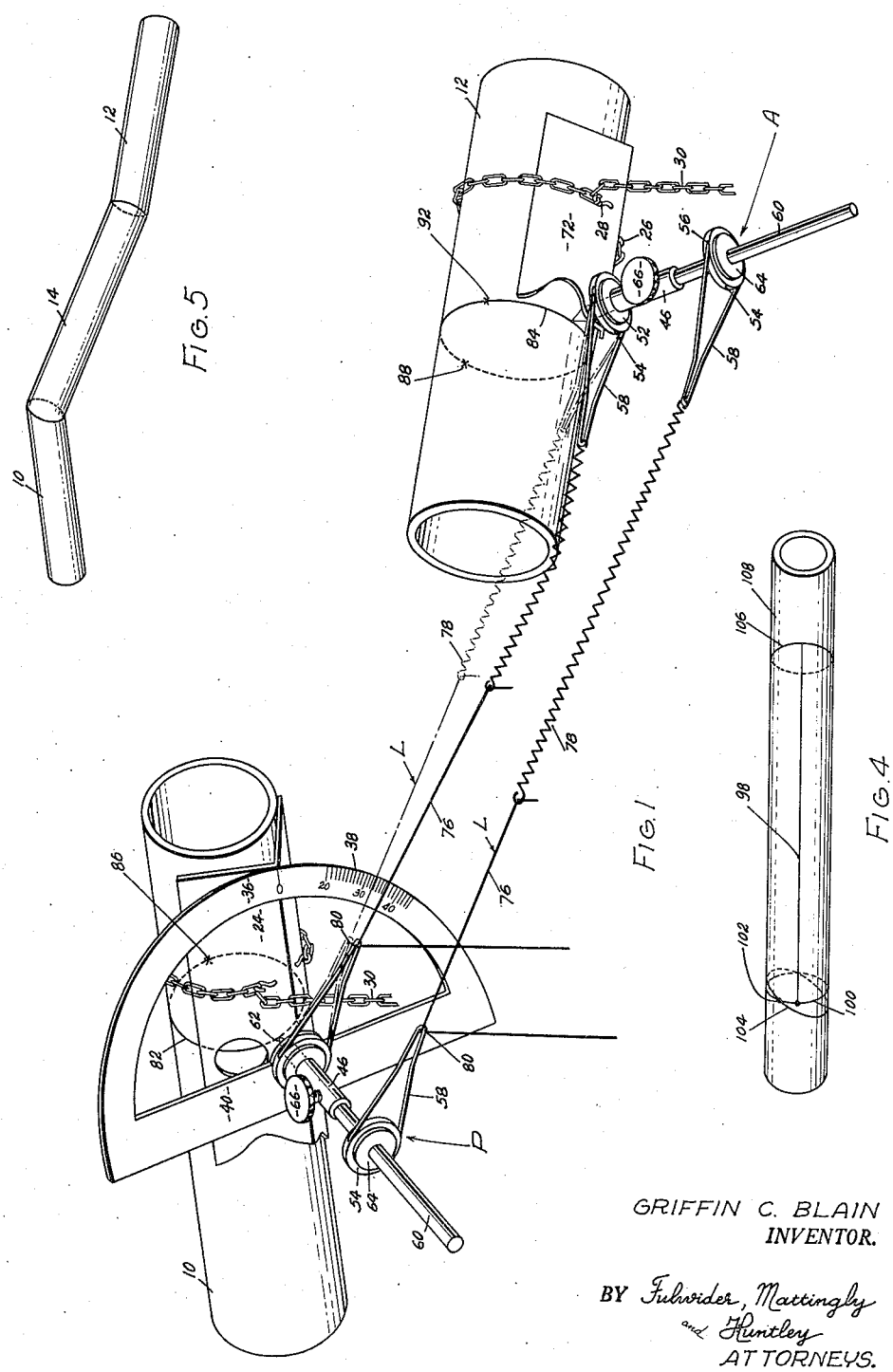

United States Patent Office 3,038,261
Patented June 12, 1962

3,038,261
PIPE LAYOUT APPARATUS AND METHOD
Griffin C. Blain, 1917 E. 59th St., Long Beach, Calif.
Filed Aug. 27, 1956, Ser. No. 606,520
6 Claims. (Cl. 33—180)

The present invention relates generally to apparatus for laying out angular cutting lines or miter joints on pipes and more particularly to apparatus of this class for use in laying out angular cutting lines on two spaced-apart pipes and a bridging pipe in such a way that the bridging pipe will fit between the spaced-apart pipes.

The problem of connecting by a bridging pipe the adjacent ends of two spaced-apart pipes is frequently encountered in welding. If the two spaced-apart pipes are parallel or if their projected center lines intersect so that they can be conceived of as lying in a common plane, the angles included between each of the spaced-apart pipes and the bridging pipe may be found without a great deal of difficulty. With this information contour lines to guide the angular cuts to be made on the ends of the bridging pipe and the corresponding ends of the spaced-apart pipes may readily be laid out with a conventional contour marker or pipe protractor.

In making a layout it is necessary to lay out four angular cutting lines. Each of the two spaced-apart pipes will have an angular cutting line marked thereon as will the opposite ends of the bridging pipe. If the cutting lines are not accurately located the ends of the bridging pipe will not register accurately with the ends of the spaced-apart pipes. If the spaced-apart pipes and the bridging pipe can be conceived of as lying in one plane as aforesaid, no difficulty will be encountered in accurately locating the four cutting lines. In this case in marking each cutting line the center of the conventional contour marker or protractor is always placed in the same position relative to said common plane.

The problem is greatly complicated where the two spaced-apart pipes that are to be joined do not lie in a common plane; i.e. they are not parallel or their axes do not intersect. In this situation there is no common plane of reference including both of the spaced-apart pipes and the bridging pipe. The planes of the desired joints at the opposite ends of the bridging pipe are not normal to the same plane, but to two different planes. The contour lines for defining one of the angles are normal to the plane defined by the intersecting axes of the bridging pipe and one of the spaced-apart pipes. The two cutting lines defining the joint at the other end of the bridging pipe are in a plane normal to a different plane defined by the intersecting axes of the other spaced-apart pipe and the bridging pipe. In this situation, in order for the elliptical ends of the pipes to register after cutting, the conventional protractor or contour marker must be centered at two points that are circumferentially spaced-apart with reference to an axis that is common to both of them.

Where such layouts are undertaken under field conditions, welders have generally been required to rely on trial and error methods. A neat and workmanlike welded joint seldom results. Sometimes the welder will build a special jig to hold the pipes in the desired position for marking. In a few special cases, specially prepared mathematical tables are available to assist the welder, for example in the case where one spaced-apart pipe is arranged at right angles to but not intersecting the second spaced-apart pipe. Occasionally, templates will be available for the use of the welder. However, all of these methods are time consuming or require special training and do not necessarily result in accurately welded joints.

An object of my invention is to provide a pipe layout apparatus and method for measuring the angles between a bridging pipe and any two spaced-apart pipes in order to mark on said pipes accurate contour cutting lines along which the pipes can be cut for joining them at said angles. This apparatus also eliminates any need for mathematical calculation or the use of templates, jigs or tables.

Another object of my invention is to furnish pipe layout apparatus of this type which reduces to a simple mechanical operation layouts that formerly were plotted only by mathematical means. The apparatus thereby permits such layouts to be made by persons having no special skills or training.

A further object of the invention is to provide pipe layout apparatus that permits contour cutting lines to be plotted on pipes to be angularly joined in a minimum amount of time.

The invention also has for an object pipe layout apparatus of this type that is very simple to manipulate.

These and other objects and advantages of the invention will be apparent from the following description of a preferred embodiment thereof and from the annexed drawings illustrating that embodiment in which:

FIGURE 1 is a perspective view showing a preferred form of pipe layout apparatus embodying the present invention disposed in position to indicate the angle of the joint to be made at one end of the bridging pipe;

FIGURE 2 is a perspective view similar to FIGURE 1 but with the parts of said apparatus reversed to measure the angle of the joint to be made at the other end of the bridging pipe;

FIGURE 3 is an end view showing the protractor device portion of said apparatus;

FIGURE 4 shows the manner of laying out the two joint angles on opposite ends of a bridging pipe; and FIGURE 5 is a perspective view showing a welded assembly made up of two spaced-apart pipes interconnected by a bridging pipe.

Referring to the drawings and in particular to FIGURES 1 and 2, there will be seen a first pipe 10 and a second pipe 12 that are fixedly held in the spaced-apart positions shown. For example, the pipes 10 and 12 may be conceived of as forming part of a refinery network or conduits in a vessel. Pipes 10 and 12 are of the same diameter and the adjacent open ends thereof are to be joined by a bridging pipe 14 in the manner shown in FIGURE 5. It will be noted that the pipes 10 and 12 are angularly related to one another in such a way that their axes do not lie in a common plane.

The preferred form of pipe layout apparatus embodying the present invention generally includes a protractor device P that is interconnected to an alignment device A by means of two linear elements L. The protractor device P can best be seen in FIGURES 2 and 3 and includes a base 24 preferably made of a short length of angle iron that is adapted to fit on a pipe in longitudinal alignment therewith. The case 24 can receive different sizes of pipe between its symmetrical legs and when mounted on the cylindrical surface of a pipe the base will remain in alignment with the longitudinal axis of the pipe. For example, the base 24 can be rotated through 360 degrees about the pipe from its position in FIGURE 3 while remaining longitudinally aligned with the axis of the pipe.

On the outer face of one of the legs of base 24 an eye pin 26 is rigidly fastened thereto, as by welding. A hook 28 is rigidly fastened to the outer face of the other leg of base 24, oppositely to the eye pin 26. One end of a link chain 30 is permanently connected to pin 26 for adjustably encircling a pipe on which the base 24 is mounted. As can be seen in FIGURE 3, an intermediate section of chain 30 is replaced by a coiled spring 32 and one of the links of the other end of chain 30 is removably connected to hook 28 to firmly hold base 24 against the pipe.

Rigidly mounted on the ridge of base 24 is a protractor plate 34 having a semi-circular member 36 that is graduated in degrees, as shown at 38. The opposite ends of member 36 are joined by a diametrical strip 40. A pair of oppositely disposed braces 42 extend from the lower side of the ends of strip 40 to the edges of base 24 in the manner shown in FIGURE 3 in order to lend rigidity to the structure.

In the center of strip 40 there is formed a semi-circular lip 44 that projects towards graduated member 36. Rigidly mounted in a bore (not shown) through lip 44 and base 24 is a sleeve 46. As can be seen by reference to FIGURES 2 and 3, sleeve 46 is centered on the centerpoint of the graduations 38, is normal to protractor plate 34 and its longitudinal axis is in alignment with a line bisecting the angle included between the legs of base 24.

The inner end of sleeve 46 is of reduced diameter, as indicated at 48 in FIGURE 3 to define a shoulder 50. The inner end 48 of the sleeve mounts a ring bearing 52 that is positioned between the top of protractor plate 34 and shoulder 50. Rotatably carried by bearing 52 is a ring 54 that has a pair of diametrically opposed holes 56 formed in its periphery. A substantially V-shaped wire clip 58 having opposed inwardly turned ends positioned in ring holes 56 is carried by ring 54 for a purpose to be set forth later.

A rod 60 is axially slidably mounted in sleeve 46. One end of this rod 60 is formed with a center punch point 62 adapted to engage the pipe 12. At approximately the middle of rod 60 a ring bearing 64 is rigidly mounted thereon to rotatably support a second ring 54. A second clip 58 is connected to second ring 54 in the same manner as the connection of the first clip and ring. Sleeve 46 mounts a set screw 66 that can be tightened to hold rod 60 in place in the sleeve. A retainer spring 68 is coiled around the stem of screw 66 to be normally compressed between the head of the screw and sleeve 46. It will be noted from FIGURE 2 that the legs of base 24 are cut out as at 70 adjacent to sleeve 46 so that the point 62 of rod 60 is exposed to view.

Alignment device A is similar to protractor 18 and certain parts thereof are interchangeable. A base 72 is provided that is made of a short length of angle iron. Base 72 can be removably attached to a pipe in longitudinal alignment therewith by the same means used on protractor base 24, i.e. an eye pin 26, hook 28, chain 30 and spring 32 (not shown).

Along the ridge of base 72 at one end thereof a sleeve 46 that is identical to protractor sleeve 46 is rigidly connected thereto. In the same manner as protractor sleeve 46, the second sleeve carries a rod 60, bearings 52 and 64, rings 54 and clips 58. The end of base 72 that carries sleeve 46 is relieved on both legs thereof, as at 74, to expose to view the point 62 of second rod 60.

Alignment device A and protractor P are interconnected by a pair of linear elements L each of which consists of a length of cord 76 or the like tied to one end of a spring 78. The other end of each spring 78 is fastened to the apex of one of clips 58 of alignment device A. Strings 76 are connected to clips 58 on protractor P by means of knots 80 formed therein that are wedgingly received in the apex portions of the clips, as is shown in FIGURE 2.

The preferred form of apparatus just described is intended to be used in conjunction with a pipe protractor or contour marking device of conventional design. Devices of this type are shown in United States Letters Patent Nos. 2,334,422 and 2,095,479. These marking devices include a protractor, a centering element therefor and a pipe encircling element that can be set at a predetermined angle relative to the pipe axis by reference to the protractor. Chalk or the like is used with these devices to mark a cutting angle on the pipe. It is important to observe that such marking devices cannot be employed per se to measure an angle nor do they incorporate means for indicating where their centering elements should be located on a pipe. Therefore such devices are valueless in layout contour cutting lines in the siutation shown in the drawings unless my invention is first used to measure the angles to be marked and to locate a point for centering the marking device.

The manner of use of the invention is as follows. A circular line or trace is drawn around each of pipes 10 and 12 as indicated at 82, 84 in FIGURE 1 in order to indicate approximately the points at which the pipes will be cut. Protractor device P is then placed on pipe 10 with point 62 on trace 82 and alignment device A placed on pipe 12 with point 62 of its rod 60 on trace 84. Chains 30 are wrapped around the pipes to hold the base members 24 and 72 in slidable contact with pipes 10 and 12 respectively. Alignment device A and protractor device P are then adjusted so that the rods 60 thereof lie in the same plane, which may easily be done by sighting across the linear elements L.

It sometimes happens that when the apparatus is adjusted in the manner just described, the inner element L is distorted from linearity by coming into contact with the projecting end of one of the pipes. This condtion is shown in FIGURE 1 wherein the desired position of the inner element L is shown in phantom line. In this type of situation the apparatus is merely rotated 180 degrees from its position of FIGURE 1 to the other side of the pipes where it will be found to function equally well without interference from the projecting ends of the pipes.

After the apparatus has been thus preliminarily adjusted, it is further manipulated to indicate the magnitude of the angle included between pipe 10 and the connecting pipe 14 and a reference point for this angle. This is done by moving protractor P and alignment device A in unison in the same direction until the inside string 76 just touches one of the graduations 38 of protractor plate 34. When this occurs, both rods 60 should be in co-planar relationship with their points 62 on their respective circular traces 82 and 84. This may be checked by sighting transversely across linear elements L as aforesaid, to see that they are in alignment. With elements L in alignment and the inside string 76 just touching protractor plate 34, the correct angle is shown by the particular graduation 38 contacted by the string. Both rods 60 are then struck a blow with a hammer to make reference points 86 and 88 on pipes 10 and 12 respectively for purposes to be presently explained.

The protractor and alignment devices are now completely removed from pipes 10 and 12 and an ordinary pipe protractor (not shown) of the type previously mentioned is placed on pipe 10. This protractor is adjusted to one-half the angle found in the manner described hereinabove and used to draw a contour cutting line 90 around pipe 10 and intersecting point 86. Contour line 90 is shown in FIGURE 2 and it will be noted that its intersection with trace 82 defines the minor axis of the eliptical contour line 90. This minor axis is normal to the plane defined by the intersecting axes of pipe 10 and bridging pipe 14.

The protractor and alignment devices are now reversed in the manner shown in FIGURE 2 with protractor P on pipe 12 and alignment device A on pipe 10. The point 62 of protractor rod 60 is placed on circular trace 84 but it should particularly be noted that the point of alignment device rod 60 is placed on contour line 90 and not on circular trace 82. The apparatus is then adjusted as before to the position of FIGURE 2 wherein the linear elements L are aligned and the inner element A just touches one of graduations 38. The angle thus found is recorded and protractor rod 60 struck a blow with a hammer to mark a reference point 92 on pipe 12. At this time the protractor and alignment devices are again removed from the pipes and the circumferential distance between points 88 and 92 along trace 84 of pipe 12 is measured and recorded. The ordinary pipe protractor is then set to one-half the angle just found, placed on pipe 12 and used to draw contour cutting line 94 through point 92.

Pipe 10 is now cut along contour line 90 and pipe 12 cut along contour line 94, the pipe ends then having the configuration shown in phantom lines in FIGURE 2. The center to center distance between the cut pipe ends is then measured. This distance is represented by the line 96 and corresponds to the axial length of the bridging pipe 14.

The bridging pipe is made from a length of pipe 108 appreciably longer than distance 96 (FIGURE 4). On such length of pipe there is laid out a longitudinal trace 98 equal to the distance 96. A circular trace 100 is then marked at one end of the trace 98. A point 102 is marked on circular trace 100 circumferentially spaced from longitudinal trace 98 in the direction shown a distance equal to the previously recorded circumferential distance between points 88 and 92 of pipe 12. An ordinary pipe protractor can then be used to draw through point 102 a contour cutting line 106, the protractor being set to the angle already cut in the end of pipe 10. The protractor is then used to lay out a contour cutting line 104 intersecting the other end of longitudinal trace 98, the protractor being set to the angle aready cut in the end of pipe 12. Pipe 108 is then cut at both ends along the contour cutting lines 104 and 106 to make the bridging pipe 14. The cut ends of bridging pipe 14 will be found to be prefectly complementary to the corresponding ends of pipes 10 and 12. Bridging pipe 14 is then laid in position between the ends of pipes 10 and 12 to be welded thereto as in FIGURE 5.

It will be apparent to those skilled in the art that the aforedescribed apparatus can also be used where prefabricated elbows are to be used to make the connecting joints. In this situation the apparatus is used in the manner set forth hereinabove to find both joint angles and to mark the points 86, 88 and 92. An elbow is then cut for each point, the angle included between the ends of the cut elbow being equal to the corresponding joint angle. Each elbow is then welded into place, being first positioned with reference to one of the points 86 or 92. The axial length of the bridging pipe can then be measured between the confronting, parallel open ends of the two elbows and the proper length of a right cylinder connector can then be cut and welded in place.

While there has been shown herein what is considered to be the preferred embodiment of the present invention, it will be apparent that various modifications and changes may be made with respect to the foregoing description without departing from the spirit of the invention or the scope of the following claims.

I claim:

1. A pipe layout apparatus, comprising: a rod; a base adapted to lie upon a first pipe and to support said rod radially of said pipe; a second rod; a base adapted to lie upon a second pipe and to support said second rod radially of said second pipe; a protractor mounted normally to said first rod; and a linear element of adjustable length extending between substantially identically located points on said rods, being connected to said first rod at the junction thereof with the center of said protractor whereby when said rods are adjusted to co-planar positions and said element is concurrently disposed in the plane of said protractor, said element indicates on said protractor the angle included between said first pipe and the plane including said rods.

2. A pipe layout apparatus, comprising: a base adapted to slidably lie upon a first pipe in parallel relation therewith; a sleeve carried by said base in radial disposition to said first pipe; a slidable rod in said sleeve whose inner end is adapted for marking contact with said first pipe; a protractor carried by said sleeve normally thereto and graduated with reference to the axis of said rod as a center; a second base adapted to lie upon a second pipe in parallel relation therewith; a sleeve located on said second base in radial disposition to said second pipe; a slidable rod in said second sleeve adapted for marking contact with said second pipe; and a linear element extending between substantially identically located points on said sleeves and connected to said first sleeve at its junction with said protractor.

3. Apparatus as set forth in claim 2 in which a second linear element extends between substantially identically located points on said rods outwardly from said first linear element with the ends of both of said linear elements being pivotally connected to said rods and sleeves respectively.

4. Apparatus as set forth in claim 2 in which both of said bases have means for holding said bases in adjusted position on said pipes.

5. A pipe layout apparatus, comprising: an angle iron base adapted to slidably lie upon a first pipe in parallel relation therewith; a sleeve rigidly mounted along the longitudinal centerline of said base in radial disposition to said first pipe; a rod slidably mounted in said sleeve having a pointed inner end for marking contact with said first pipe; adjustable means in said sleeve for frictionally engaging said rod; a protractor carried by said sleeve normal thereto and graduated with reference to the axis of said rod as a center; a ring rotatably mounted on said sleeve at its junction with said protractor; a ring rotatably mounted on said rod outwardly from said protractor; a pair of V-shaped wire clips each of which has inwardly turned ends that pivotally engage diametrically opposite holes formed in said rings; a second angle iron base adapted to slidably lie upon a second pipe in parallel relation therewith; a sleeve rigidly mounted along the longitudinal centerline of said second base in radial disposition to said second pipe; a rod slidable in said second sleeve having a pointed inner end for marking contact with said second pipe; adjustable means in said sleeve for frictionally engaging said second rod; a ring rotatably mounted on said sleeve at its junction with said second base; a ring rotatably mounted on said second rod outwardly from said second base; a pair of V-shaped wire clips each of which has inwardly turned ends that pivotally engage diametrically opposite holes formed in said rings; and a pair of linear elements one of which interconnects the inner pair of said clips and the other of which interconnects the outer pair of said clips, each of said elements consisting of a cord tied at one end thereof to an elongate coil spring.

6. A method of finding the angles between a bridging pipe and each of two spaced-apart pipes, and contour line marking reference points for both of said angles, comprising: marking a circular trace on each of said spaced-apart pipes; radially positioning a rod on the circular trace of each of said spaced apart pipes in co-planar relationship in such a way that a linear element interconnecting the inner ends of said rods is normal to one of them to indicate a first one of said reference points at the intersection of the inner end of said one rod with a first one of said circular traces, with a first one of said angles being defined at said first reference point between the projection of said linear element and the axis of the pipe on which said first reference point is indicated; marking a contour line through said first reference point defining an angle of one-half said first angle; radially positioning a rod on the second of said circular traces and radially positioning a rod on said contour line in such a way that said rods are in co-planar relationship with a linear element interconnecting the inner ends of said rods normal to the rod that intersects said second circular trace to indicate the second of said reference points at the intersection of said rod and said second circular trace, with the second of said angles being defined at said second reference point between the projection of said linear element and the axis of the pipe on which said second reference point is indicated.

(References on following page)

References Cited in the file of this patent

UNITED STATES PATENTS

| | | |
|---|---|---|
| 199,425 | Ericson | Jan. 22, 1878 |
| 645,653 | White | Mar. 20, 1900 |
| 1,327,198 | Carlson | Jan. 6, 1920 |
| 1,590,499 | Cozad | June 29, 1926 |
| 1,991,117 | Porteous et al. | Feb. 12, 1935 |
| 2,381,010 | Spigelsky | Aug. 7, 1945 |
| 2,594,191 | Mathey | Apr. 22, 1952 |
| 2,619,731 | Zenz | Dec. 2, 1952 |
| 2,632,954 | Lieberman | Mar. 31, 1953 |
| 2,636,273 | Morris | Apr. 28, 1953 |
| 2,656,607 | Harding | Oct. 27, 1953 |
| 2,775,042 | MacMillan | Dec. 25, 1956 |
| 2,788,584 | Adrien | Apr. 16, 1957 |
| 2,832,152 | Blackshaw | Apr. 29, 1958 |
| 2,832,153 | Binckley | Apr. 29, 1958 |

FOREIGN PATENTS

| | | |
|---|---|---|
| 128,677 | Germany | July 28, 1901 |